US012373929B2

(12) United States Patent
Su et al.

(10) Patent No.: US 12,373,929 B2
(45) Date of Patent: Jul. 29, 2025

(54) UNDERWATER IMAGE COLOR RESTORATION METHOD AND APPARATUS, AND UNDERWATER VIDEO COLOR RESTORATION METHOD AND APPARATUS

(71) Applicant: ARASHI VISION INC., Shenzhen (CN)

(72) Inventors: Tan Su, Shenzhen (CN); Fei Gao, Shenzhen (CN)

(73) Assignee: ARASHI VISION INC., Shenzhen (CN)

( * ) Notice: Subject to any disclaimer, the term of this patent is extended or adjusted under 35 U.S.C. 154(b) by 184 days.

(21) Appl. No.: 18/033,352

(22) PCT Filed: Oct. 22, 2021

(86) PCT No.: PCT/CN2021/125889
§ 371 (c)(1),
(2) Date: Apr. 23, 2023

(87) PCT Pub. No.: WO2022/083765
PCT Pub. Date: Apr. 28, 2022

(65) Prior Publication Data
US 2023/0401674 A1 Dec. 14, 2023

(30) Foreign Application Priority Data

Oct. 23, 2020 (CN) .......................... 202011148596.1

(51) Int. Cl.
*G06T 5/00* (2024.01)
(52) U.S. Cl.
CPC ...... *G06T 5/00* (2013.01); *G06T 2207/10024* (2013.01); *G06T 2207/20076* (2013.01)

(58) Field of Classification Search
CPC ............ G06T 5/00; G06T 2207/10024; G06T 2207/20076; G06T 5/92; G06T 7/90; G06T 5/50; G06T 2207/20221
See application file for complete search history.

(56) References Cited

U.S. PATENT DOCUMENTS

| 2012/0200731 A1* | 8/2012 | Park | H04N 25/133 |
| | | | 348/223.1 |
| 2016/0078605 A1* | 3/2016 | Huang | G06T 5/73 |
| | | | 382/167 |

(Continued)

FOREIGN PATENT DOCUMENTS

| CN | 111696052 A * | 9/2020 | ............. G06T 5/001 |
| CN | 112348904 A | 2/2021 | |

*Primary Examiner* — Oneal R Mistry
*Assistant Examiner* — Jongbong Nah
(74) *Attorney, Agent, or Firm* — BAYES PLLC

(57) ABSTRACT

The present invention provides an underwater image color restoration method. In the method, 8-bit RGB pixel values of pixels in an underwater image are converted to a linear sRGB space for adjustment processing, adjusted pixel values are converted to 8-bit RGB pixel values, and then the acquired 8-bit RGB pixel values are fused with the adjusted pixel values to obtain a restored underwater image. Therefore, a foreground object in the underwater image or an underwater video processed using the solution of the present invention is natural and rich in color; in addition, the natural blue and green colors of background seawater are preserved, and the viewing effect of an entire picture is improved significantly and is comparable to or even better than the effect that can be achieved in the past after considerable manual toning.

17 Claims, 2 Drawing Sheets

(56) References Cited

U.S. PATENT DOCUMENTS

2018/0211370 A1\* 7/2018 Chen .................... H04N 1/6008
2023/0112169 A1\* 4/2023 Bekerman ................. G06T 5/40
  382/162

\* cited by examiner

UNDERWATER IMAGE COLOR RESTORATION METHOD AND APPARATUS, AND UNDERWATER VIDEO COLOR RESTORATION METHOD AND APPARATUS

CROSS REFERENCE TO RELATED APPLICATIONS

The present invention is a 35 U.S.C. § 371 National Phase conversion of International (PCT) Patent Application No. PCT/CN2021/125889, filed on Oct. 22, 2021, which claims benefit of Chinese Application No. 202011148596.1, filed on Oct. 23, 2020, the disclosure of which is incorporated by reference herein. The PCT International Patent Application was filed and published in Chinese.

BACKGROUND OF THE INVENTION

Field Of The Invention

The present invention belongs to the field of image processing, and in particular relates to a method and a device for restoring color of an underwater image or an underwater video, and a computer-readable storage medium.

Description ofRelated Art

Underwater vision is not only widely used in scientific researches such as ocean detection, underwater engineering monitoring, etc., but also an important source of shooting material for the vast number of photographers. Therefore, it is particularly important to obtain real underwater images.

Because red light wavelength is longer in visible light, of which the attenuation that propagates in water is greater than blue light and green light, the image sensor of photographing device receives red light far less than blue light and green light, which causes red color in the picture taken underwater is seriously insufficient, the color of the underwater scene is distorted, and the overall color is blue or green.

BRIEF SUMMARY OF THE INVENTION

Automatic white balance algorithm of conventional cameras cannot process the picture of the underwater scene where the red color is seriously insufficient, the processed picture often lacks red color or is overcompensated to cause the overall purple color in the picture, and may restore underwater colors to a certain extent using video color correction by manual post processing, however, it takes a lot of time and cannot be adjusted specifically for each pixel of each frame.

The object of the present invention is to provide a method for restoring color of an underwater image, a device, an electronic device and a computer-readable storage medium, which aims to solve the disadvantages of an existing underwater image restoration method.

According to a first aspect, the present invention provides a method for restoring color of an underwater image, comprising steps of S1 to S8:

S1: obtaining 8-bit RGB pixel values of each pixel of an underwater image and converting the 8-bit RGB pixel values to a linear sRGB color space; that is, converting a pixel value $r_{i\text{-}0}$ of the red channel, a pixel value $g_{i\text{-}0}$ of the green channel, and a pixel value $b_{i\text{-}0}$ of the blue channel of each pixel in 8-bit RGB, to obtain a pixel value $r_{i\text{-}1}$ of the red channel, a pixel value $g_{i\text{-}1}$ of the green channel, and a pixel value $b_{i\text{-}1}$ of the blue channel of each pixel in a linear sRGB color space;

S2: adjusting the pixel value of each channel of each pixel according to a mean value of the pixel value of each channel obtained in step S1, and obtaining an adjusted pixel value $r_{i\text{-}2}$ of the red channel of each pixel, an adjusted pixel value $g_{i\text{-}2}$ of the green channel, and an adjusted pixel value $b_{i\text{-}2}$ of the blue channel;

S3: calculating a weight value $\omega_i$ of each pixel according to the adjusted pixel value of each channel of each pixel obtained in step S2;

S4: calculating a gain Rg of the red channel and a gain Bg of the blue channel of the image according to the weight value @i obtained in step S3; and adjusting, according to the gain Rg of the red channel and the gain Bg of the blue channel, the adjusted pixel value of each channel of each pixel obtained in step S2, to obtain an adjusted pixel value $r_{i\text{-}3}$ of the red channel of each pixel, an adjusted pixel value $g_{i\text{-}3}$ of the green channel, and an adjusted pixel value $b_{i\text{-}3}$ of the blue channel;

S5: converting the adjusted pixel values of each pixel in the linear sRGB color space obtained in step S4 to 8-bit RGB pixel values, and obtaining a pixel value $r_{i\text{-}4}$ of the red channel, a pixel value $g_{i\text{-}4}$ of the green channel, and a pixel value $b_{i\text{-}4}$ of the blue channel of each pixel after conversion;

S6: separately ranking the pixel value of each channel of each pixel obtained in step S5, and obtaining a large adjustment value and a small adjustment value of each channel according to the ranking result; i.e., a large adjustment value Rmax and a small adjustment value Rmin of the red channel, a large adjustment value Gmax and a small adjustment value Gmin of the green channel, and a large adjustment value Bmax and a small adjustment value Bmin of the blue channel;

S7: adjusting, according to the large adjustment value and the small adjustment value of each channel obtained in step S6, the pixel value of each channel of each pixel obtained in step S5, and obtaining an adjusted pixel value $r_{i\text{-}5}$ of the red channel, an adjusted pixel value $g_{i\text{-}5}$ of the green channel, and an adjusted pixel value $b_{i\text{-}5}$ of the blue channel of each pixel; and S8: fusing, according to the weight value $\omega_i$ obtained in step S3, the 8-bit RGB pixel values of each pixel obtained in step S1 with the adjusted pixel value of each channel of each pixel obtained in step S7 to obtain a fused pixel value $r_{i\text{-}6}$ of the red channel of each pixel, a fused pixel value $g_{i\text{-}6}$ of the green channel, and a fused pixel value $b_{i\text{-}6}$ of the blue channel; and outputting a restored underwater image according to the pixel value of each channel of each pixel after fusion.

According to a second aspect, the present invention provides a method for restoring color of an underwater video frame provided in the present embodiment, comprising steps of:

capturing an underwater video to be restored; and
processing each video frame of the underwater video to be restored according to the method for restoring color of an underwater image provided in the first embodiment, and obtaining a video after color restoration.

According to a third aspect, the present invention provides a device for restoring color of an underwater image:

a first acquisition module, for obtaining 8-bit RGB pixel values of each pixel of an underwater image;
a first conversion module, for converting the 8-bit RGB pixel values of each pixel to a linear sRGB color space;

a first adjustment module, for adjusting the pixel value of each channel of each pixel according to a mean pixel value of each channel of each pixel in the linear sRGB color space;

a weight calculation module, for calculating a weight value of each pixel according to the pixel value of each channel of each pixel adjusted by the first adjustment module;

a gain calculation module, for calculating a gain of the red channel and a gain of the blue channel of the image according to the weight value;

a second adjustment module, for adjusting, according to the gain of the red channel and the gain of the blue channel, the pixel value of each channel of each pixel adjusted by the first adjustment module;

a second conversion module, for converting the pixel values of each pixel adjusted by the second adjustment module in the linear sRGB color space to 8-bit RGB pixel values;

a second acquisition module, for obtaining a large adjustment value and a small adjustment value of each channel converted by the second conversion module, where the large adjustment value and the small adjustment value of each channel are related to a ranking result of ranking the pixel value of each channel of each pixel;

a third adjustment module, for adjusting, according to the large adjustment value and the small adjustment value of each channel, the pixel value of each channel of each pixel converted by the second conversion module;

a fusion module, for fusing, according to the weight value obtained by the weight calculation module, the 8-bit RGB pixel values of each pixel obtained by the first acquisition module with the pixel value of each channel of each pixel adjusted by the third adjustment module, to obtain a fused pixel value of each channel of each pixel; and an output module, for outputting the fused pixel value of each channel of each pixel fused by the fusion module.

According to a fourth aspect, a device for restoring color of an underwater video provided in the present invention, includes:

a capture module, for capturing an underwater video to be restored; and a video restoration module, for processing each video frame of the underwater video to be restored according to the above-mentioned method for restoring color of an underwater image to obtain a video after color restoration.

According to a fifth aspect, the present invention provides an electronic device, which includes:

a memory, for storing a computer program thereon; and a processor, for executing the computer program to perform the above-mentioned methods for restoring color of an underwater image or an underwater video.

According to a sixth aspect, the present invention provides a computer-readable storage medium storing a computer program thereon, which when being executed by a processor, cause the processor to perform the above-mentioned methods for restoring color of an underwater image or an underwater video.

Compared with the prior art, in the present invention, color restoration is performed for each pixel in an underwater image according to specific steps. Therefore, a foreground object in the underwater image or in an underwater video processed using the methods of the present invention is natural and rich in color; in addition, the natural blue and green colors of background seawater are preserved, and the viewing effect of an entire picture is improved significantly and is comparable to or even better than the effect that can be achieved in the past after considerable manual toning.

DETAILED DESCRIPTION OF THE INVENTION

In order to make the purpose of the present invention, technical solutions and beneficial effects clearer, the present invention will be described in further detail below in conjunction with the accompanying drawings and embodiments. It should be understood that the specific embodiments described here are only used to explain the present invention, not to limit the present invention.

In order to illustrate the technical solution of the present invention, the following will be described by specific examples.

First Embodiment

Figure 1:
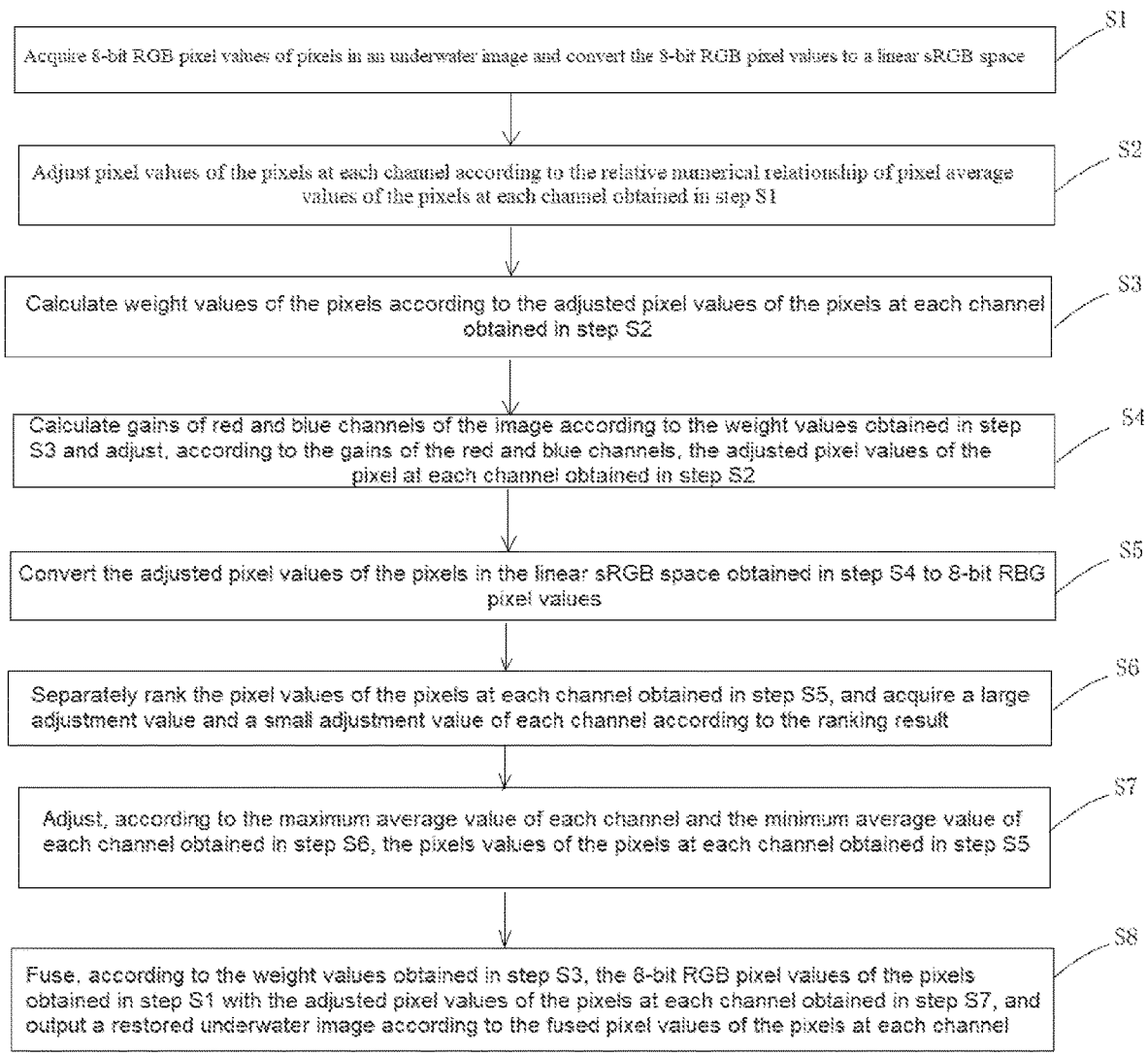
FIG. 1 is the flowchart of a method for restoring color of an underwater image in accordance with an embodiment of the present invention.

As shown in FIG. 1, a method for restoring color of an underwater image in accordance with an embodiment of the present invention, comprises the following steps of:

an underwater image in this embodiment is a photo or a video frame captured by a shooting device in water.

S0: converting an underwater image to 8-bit RGB color space from other color spaces.

If the captured photo or video frame is originally in an 8-bit RGB color space, then directly enter step S1; if the captured photo or video frame is in other space (such as YUV), then convert the captured photo or video frame to an 8-bit RGB color space first, and then go to step S1.

S1: obtaining 8-bit RGB pixel values of each pixel of an underwater image and converting the 8-bit RGB pixel values to a linear sRGB color space; that is, converting a pixel value $r_{i\text{-}0}$ of the red channel, a pixel value $g_{i\text{-}0}$ of the green channel, and a pixel value $b_{i\text{-}0}$ of the blue channel of each pixel in 8-bit RGB, to obtain a pixel value $r_{i\text{-}1}$ of the red channel, a pixel value $g_{i\text{-}1}$ of the green channel, and a pixel value $b_{i\text{-}1}$ of the blue channel of each pixel in a linear sRGB color space.

First, obtaining a pixel value $r_{i\text{-}0}$ of the red channel, a pixel value $g_{i\text{-}0}$ of the green channel, and a pixel value $b_{i\text{-}0}$ of the blue channel of each pixel in an 8-bit RGB pixel values (range 0-255), then converting the pixel value of each channel to the linear sRGB color space according to a sRGB standard, and obtaining a pixel value $r_{i\text{-}1}$ of the red channel, a pixel value $g_{i\text{-}1}$ of the green channel, and a pixel value $b_{i\text{-}1}$ of the blue channel of each pixel in a linear sRGB color space, where the converted pixel values of each pixel in the linear sRGB space range from 0 to 1, for specific conversion, please refer to:

https://www.w3.org/Graphics/Color/sRGB.

In the present embodiment, for any pixel of the underwater image, its pixel value of each channel can be converted from an 8-bit RGB color space to a linear sRGB color space according to the following method.

The pixel value of each channel of each pixel in a RGB color space (range 0-255) is divided by 255: if $r_{i\text{-}0} \div 255$, $g_{i\text{-}0} \div 255$, $b_{i\text{-}0} \div 255$ are all less than 0.03928, the converted pixel values of each pixel in the linear sRGB color space are: $r_{i\text{-}1} = r_{i\text{-}0} \div 255 \div 12.92$; $g_{i\text{-}1} = g_{i\text{-}0} \div 255 \div 12.92$; $b_{i\text{-}1} = b_{i\text{-}0} \div 255 \div 12.92$; otherwise, the converted pixel values of each pixel in the linear sRGB color space are:

$$r_{i\text{-}1} = [(r_{i\text{-}0} \div 255 + 0.055) \div 1.055]^{2.4};$$

$$g_{i\text{-}1} = [(g_{i\text{-}0} \div 255 + 0.055) \div 1.055]^{2.4};$$

$$b_{i\text{-}1} = [(b_{i\text{-}0} \div 255 + 0.055) = 1.055]^{2.4}.$$

S2: adjusting the pixel value of each channel of each pixel according to a mean value of the pixel value of each channel obtained in step S1, and obtaining an adjusted pixel value $r_{i\text{-}2}$ of the red channel of each pixel, an adjusted pixel value $g_{i\text{-}2}$ of the green channel, and an adjusted pixel value $b_{i\text{-}2}$ of the blue channel.

In the present embodiment, obtaining respectively a mean pixel value Ra of the red channel, a mean pixel value Ga of the green channel, a mean pixel value Ba of the blue channel of each pixel; if the mean pixel value Ga of the green channel is the largest, then the adjusted pixel value of the red channel is $r_{i\text{-}2} = r_{i\text{-}1} + (Ga-Ra) \times (1.5 - r_{i\text{-}1}) \times g_{i\text{-}1}$, the adjusted pixel value of the blue channel is $b_{i\text{-}2} = b_{i\text{-}1} + (Ga-Ba) \times (1 - b_{i\text{-}1}) \times g_{i\text{-}1}$, the adjusted pixel value of the green channel is $g_{i\text{-}2} = g_{i\text{-}1}$; if the mean pixel value Ba of the blue channel is the largest, then the adjusted pixel value of the red channel is $r_{i\text{-}2} = r_{i\text{-}1} + (Ba-Ra) \times (1.5 - r_{i\text{-}1}) \times g_{i\text{-}1}$, the adjusted pixel value of the blue channel is $b_{i\text{-}2} = b_{i\text{-}1}$, the adjusted pixel value of the green channel is $g_{i\text{-}2} = g_{i\text{-}1} - (Ba-Ga) \times (1-g_{i\text{-}1}) \times g_{i\text{-}1}$; if the mean pixel value Ra of the red channel is the largest, then the pixel values are not adjusted, that is, the pixel value of the red channel is $r_{i\text{-}2} = r_{i\text{-}1}$, the pixel value of the green channel is $g_{i\text{-}2} = g_{i\text{-}1}$, and the pixel value of the blue channel is $b_{i\text{-}2} = b_{i\text{-}1}$.

S3: calculating a weight value $\omega_i$ of each pixel according to the adjusted pixel value of each channel of each pixel obtained in step S2.

In the present embodiment, a weight value $\omega_i$ of each pixel is calculated according to the formula: $\omega_i = (r_{i\text{-}2} + \alpha) * \beta / (b_{i\text{-}2} + \alpha)$, where $\alpha$ and $\beta$ are empirical values. Specifically, in an optimization of this embodiment, the value of $\alpha$ is 0.00015, the value of $\beta$ is 3, and the weight value $\omega_i$ of each pixel is adjusted according to a calculated value: when the calculated value of $\omega_i$ is less than 0.1, the weight value $\omega_i$ is adjusted to 0.1; when the calculated value of $\omega_i$ is greater than 0.8, the weight value $\omega_i$ is adjusted to 0.8; when the calculated value of $\omega_i$ is between 0.1 and 0.8, the weight value $\omega_i$ is not adjusted.

S4: calculating a gain Rg of the red channel and a gain Bg of the blue channel of the image according to the weight value $\omega_i$ obtained in step S3; and adjusting, according to the gain Rg of the red channel and the gain Bg of the blue channel, the adjusted pixel value of each channel of each pixel obtained in step S2, to obtain an adjusted pixel value $r_{i\text{-}3}$ of the red channel of each pixel, an adjusted pixel value $g_{i\text{-}3}$ of the green channel, and an adjusted pixel value $b_{i\text{-}3}$ of the blue channel.

In this embodiment, step S4 includes the following substeps of:

S41: according to the pixel value $r_{i\text{-}2}$ of the red channel, the pixel value $g_{i\text{-}2}$ of the green channel, and the pixel value $b_{i\text{-}2}$ of the blue channel, and the weight value $\omega_i$ of each pixel, calculating a weighted mean of the red channel, a weighted mean of the green channel, and a weighted mean of the blue channel of each pixel. Where a weighted mean of the red channel is calculated according to the formula:

$$Raw = (1/n) * \sum_{i=1}^{n} r_{i-2} * \omega i,$$

a weighted mean of the green channel is calculated according to the formula:

$$Gaw = (1/n) * \sum_{i=1}^{n} g_{i-2} * \omega i,$$

a weighted mean of the blue channel is calculated according to the formula:

$$Baw = (1/n) * \sum_{i=1}^{n} b_{i-2} * \omega i,$$

and "n" represents the number of pixels in the image.

S42: calculating a gain Rg=Gaw/Raw of the red channel and a gain Bg=Gaw/Baw of the blue channel.

S43: calculating a pixel value $r_{i\text{-}3} = r_{i\text{-}2} * Rg$ of the red channel after gain, and a pixel value $b_{i\text{-}3} = b_{i\text{-}2} * Rg$ of the blue channel after gain; where if the pixel value after gain is greater than 1, adjust the pixel value to 1 to meet the condition that the pixel value of each pixel in the linear sRGB space ranges from 0 to 1.

S5: converting the adjusted pixel values of each pixel in the linear sRGB color space obtained in step S4 to 8-bit RGB pixel values, and obtaining a pixel value $r_{i\text{-}4}$ of the red channel, a pixel value $g_{i\text{-}4}$ of the green channel, and a pixel value $b_{i\text{-}4}$ of the blue channel of each pixel after conversion.

According to the sRGB standard, the pixel value of each channel of each pixel is converted from linear sRGB (0-1) to 8-bit RGB (0-255), and the conversion method is:

If $r_{i\text{-}3}$, $g_{i\text{-}3}$, $b_{i\text{-}3}$ are all less than 0.00304, then the converted pixel values of each pixel in 8-bit RGB are respectively:

$$r_{i\text{-}4} = r_{i\text{-}3} * 255 * 12.92; g_{i\text{-}4} = g_{i\text{-}3} * 255 * 12.92; b_{i\text{-}4} = b_{i\text{-}3} * 255 * 12.92;$$

otherwise, the converted pixel values of each pixel in 8-bit RGB are respectively:

$$r_{i\text{-}4} = (1.055 * r_{i\text{-}3}{}^{\wedge}(1/2.4) - 0.055) * 255;$$

$$g_{i\text{-}4} = (1.055 * g_{i\text{-}3}{}^{\wedge}(1/2.4) - 0.055) * 255;$$

$$b_{i\text{-}4} = (1.055 * b_{i\text{-}3}{}^{\wedge}(1/2.4) - 0.055) * 255.$$

S6: separately ranking the pixel value of each channel of each pixel obtained in step S5, and obtaining a large adjustment value and a small adjustment value of each channel according to the ranking result; i.e., a large adjustment value Rmax and a small adjustment value Rmin of the red channel, a large adjustment value Gmax and a small adjustment value Gmin of the green channel, and a large adjustment value Bmax and a small adjustment value Bmin of the blue channel.

In this embodiment, the large adjustment value and the small adjustment value of each channel can be obtained in two approaches.

a first approach: first, ranking the pixel value of each channel of each pixel obtained in step S5 from large to small, obtaining a top pixel value according to a predetermined proportion (such as 0.1%) and a last pixel value according to a predetermined proportion (such as 0.1%) of each channel, calculating a maximum mean value and a minimum mean value of each channel, and then determining the maximum mean value and minimum mean value of each channel respectively as the large adjustment value and the small adjustment value of each channel, that is, the large adjustment value Rmax and the small adjustment value Rmin of the red channel, the large adjustment value Gmax and the small adjustment value Gmin of the green channel, and the large adjustment value Bmax and the small adjustment value Bmin of the blue channel.

A second approach: first, ranking the converted pixel value of each channel of each pixel obtained in step S5 from large to small, determining a pixel value of the [n*0.1%]th pixel in order from large to small as the large adjustment value of each channel, and a pixel value of the reciprocal [n*0.1%]th pixel as the small adjustment value of each channel, where n is the number of pixels, and the symbol [ ] means rounding.

S7: adjusting, according to the large adjustment value and the small adjustment value of each channel obtained in step S6, the converted pixel values of each channel of each pixel obtained in step S5, and obtaining an adjusted pixel value $r_{i-5}$ of the red channel, an adjusted pixel value $g_{i-5}$ of the green channel, and an adjusted pixel value $b_{i-5}$ of the blue channel of each pixel.

In this embodiment, determining the maximum value RGBmax from the large adjustment value Rmax of the red channel, the large adjustment value Gmax of the green channel, and the large adjustment value Bmax of the blue channel, that is, RGBmax=Max(Rmax, Gmax, Bmax); determining the minimum value RGBmin from the small adjustment value Rmin of the red channel, the small adjustment value Gmin of the green channel, and the small adjustment value Bmin of the blue channel, that is, RGBmin=Mmin(Rmin, Gmin, .Bmin); and then calculating a pixel value of each channel of each pixel according to the following formulas:

$$r_{i-5}=(r_{i-4}-Rmin)*(RGBmax-RGBmin)/(Rmax-Rmin)+RGBmin;$$

$$g_{i-5}=(g_{i-4}-Gmin)*(RGBmax-RGBmin)/(Gmax-Gmin)+RGBmin;$$

$$b_{i-5}=(b_{i-4}-Bmin)*(RGBmax-RGBmin)/(Bmax-Bmin)+RGBmin.$$

S8: fusing, according to the weight value $\omega_i$ obtained in step S3, the 8-bit RGB pixel values of each pixel obtained in step S1 with the adjusted pixel value of each channel of each pixel obtained in step S7 to obtain a fused pixel value $r_{i-6}$ of the red channel of each pixel, a fused pixel value $g_{i-6}$ of the green channel, and a fused pixel value $b_{i-6}$ of the blue channel; and outputting a restored underwater image according to the fused pixel value of each channel of each pixel.

In the present embodiment, the fused pixel value of each channel of each pixel can be calculated according to the following formulas:

$$r_{i-6}=r_{i-5}*\omega_i+r_{i-0}*(1-\omega_i);$$

$$g_{i-6}=g_{i-5}*\omega_i+g_{i-0}*(1-\omega_i);$$

$$b_{i-6}=b_{i-5}*\omega_i+b_{i-0}*(1-\omega_i).$$

Then, outputting the restored underwater image according to the fused pixel value $r_{i-6}$, $g_{i-6}$, $b_{i-6}$ of each pixel of each channel.

Second Embodiment

A method for restoring color of an underwater video frame provided in the present embodiment, comprises the following steps of:

step 1: capturing an underwater video to be restored; and step 2: processing each video frame of the underwater video to be restored according to the method for restoring color of an underwater image provided in the first embodiment, to obtain a video frame after color restoration, and then outputting video frames in sequence to obtain a video after color restoration.

In one optimization of the present embodiment, when restore color of the video frames other than the first frame of the underwater video to be restored, calculate the gains of the red and blue channels of the current frame in step S4 according to the following formulas:

$$Rg_i=Rg_{i-1}*\theta_1+Gaw/Raw*(1-\theta_1);$$

$$Bg_i=Bg_{i-1}*\theta_1+Gaw/Baw*(1-\theta_1);$$

where, $Rg_i$ is a gain of the red channel of the current frame, and $Rg_{i-1}$ is a gain of the red channel of the previous frame, $Bg_i$ is a gain of the blue channel of the current frame, and $Bg_{i-1}$ is a gain of the blue channel of the previous frame; Raw is a weighted mean of the red channel of each pixel of the current frame calculated according to the weight value, Gaw is a weighted mean of the green channel of each pixel of the current frame calculated according to the weight value, Baw is a weighted mean of the blue channel of each pixel of the current frame calculated according to the weight value; Raw, Gaw, and Baw can be calculated according to the formulas in the first embodiment; $\theta_1$ is an update rate, which is an empirical value; and in this embodiment, the value of $\theta_1$ is 0.98.

In another optimization of the present embodiment, when restore color of the video frames other than the first frame of the underwater video to be restored, calculate a large adjustment value and a small adjustment value of each channel in step S6 according to the following formulas:

$$Rmax_i=Rmax_{i-1}*\theta_2+Rmax*(1-\theta_2), Rmin_i=Rmin_{i-1}*\theta_2+Rmin*(1-\theta_2);$$

$$Gmax_i=Gmax_{i-1}*\theta_2+Gmax*(1-\theta_2), Gmin_i=Gmin_{i-1}*\theta_2+Gmin*(1-\theta_2);$$

$$Bmax_i=Bmax_{i-1}*\theta_2+Bmax*(1-\theta_2), Bmin_i=Bmin_{i-1}*\theta_2+Bmin*(1-\theta_2);$$

where $Rmax_i$ is a large adjustment value of the red channel of the current frame, $Rmax_{i-1}$ is a large adjustment value of the red channel of the previous frame, Rmax is a larger adjustment value directly calculated according to ranking the pixel value of the red channel of each pixel of the current frame; $Gmax_i$ is a large adjustment value of the green channel of the current frame, $Gmax_{i-1}$ is a large adjustment value of the green channel of the previous frame, Gmax is a larger adjustment value directly calculated according to ranking the pixel value of the green channel of each pixel of the current frame; $Bmax_i$ is a large adjustment value of the blue channel of the current frame, $Bmax_{i-1}$ is a large adjustment value of the blue channel of the previous frame, Bmax is a larger adjustment value directly calculated according to ranking the pixel value of the blue channel of each pixel of the current frame; $\theta_2$ is an update rate, which is an empirical value; and in this embodiment, the value of $\theta_2$ is 0.98.

in the present embodiment, the adjustment of each pixel of a frame is related to the corresponding pixel of the previous frame, so that the color transformation between the corresponding pixels between adjacent video frames is smoother, and the output video after color correction is more natural.

Third Embodiment

Figure 2:
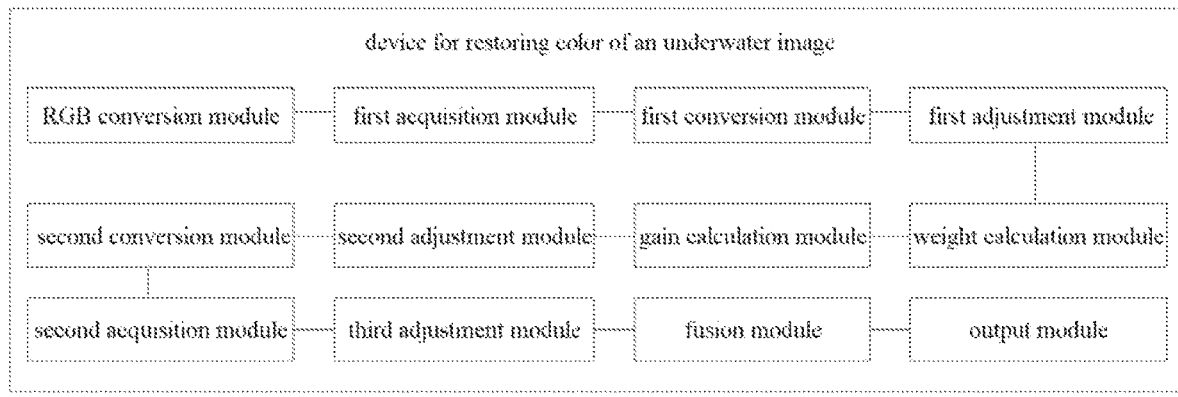
FIG. 2 is a block diagram of a device for restoring color of the underwater image in accordance with the embodiment of the present invention.

As shown in FIG. 2, this embodiment provides a device for restoring color of an underwater image, which includes: a first acquisition module, for obtaining 8-bit RGB pixel values of each pixel of an underwater image; a first conversion module, for converting the 8-bit RGB pixel values of each pixel to a linear sRGB color space; a first adjustment module, for adjusting the pixel value of each channel of each pixel according to a mean pixel value of each channel of each pixel in the linear sRGB color space; a weight calculation module, for calculating a weight value of each pixel according to the pixel value of each channel of each pixel adjusted by the first adjustment module; a gain calculation module, for calculating a gain of the red channel and a gain of the blue channel of the image according to the weight value; a second adjustment module, for adjusting, according to the gain of the red channel and the gain of the blue channel, the pixel value of each channel of each pixel adjusted by the first adjustment module; a second conversion module, for converting the pixel values of each pixel adjusted by the second adjustment module in the linear sRGB color space to 8-bit RGB pixel values; a second acquisition module, for obtaining a large adjustment value and a small adjustment value of each channel converted by the second conversion module, where the large adjustment value and the small adjustment value of each channel are related to a ranking result of ranking the pixel value of each channel of each pixel; a third adjustment module, for adjusting, according to the large adjustment value and the small adjustment value of each channel, the pixel value of each channel of each pixel converted by the second conversion module; a fusion module, for fusing, according to the weight value obtained by the weight calculation module, the 8-bit RGB pixel values of each pixel obtained by the first acquisition module with the pixel value of each channel of each pixel adjusted by the third adjustment module, to obtain a fused pixel value of each channel of each pixel; and an output module, for outputting the fused pixel value of each channel of each pixel fused by the fusion module.

In the optimization of the present embodiment, an RGB conversion module is also included for converting the underwater image to be restored to the 8-bit RGB space from other color spaces.

Fourth Embodiment

Figure 3:
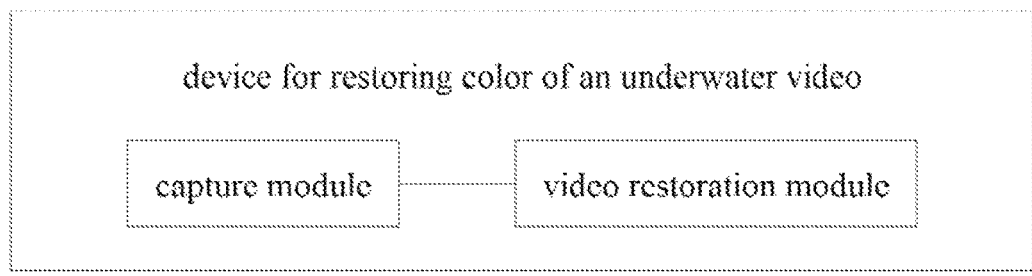
FIG. 3 is a block diagram of the for restoring color of the underwater image in accordance with an embodiment of the present invention.

As shown in FIG. 3, this embodiment provides a device for restoring color of an underwater video, which includes: a capture module, for capturing an underwater video to be restored; and a video restoration module, for processing each video frame of the underwater video to be restored according to the method for restoring color of an underwater image in the second embodiment to obtain a video after color restoration.

Fifth Embodiment

Figure 4:
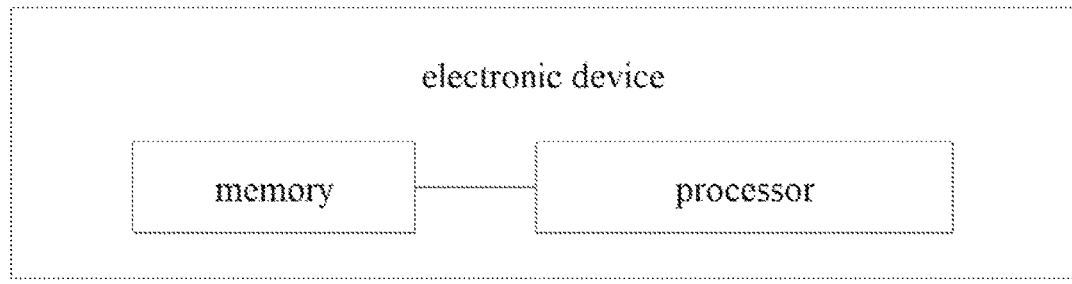
FIG. 4 is a block diagram of an electronic device in accordance with an embodiment of the present invention.

An electronic device, as shown in FIG. 4, in this embodiment, includes: a memory, for storing a computer program thereon; and a processor, for executing the computer program to perform the methods for restoring color of an underwater image or an underwater video in the first or second embodiments. The electronic device in this embodiment may specifically be a camera or a mobile phone.

Sixth Embodiment

In this embodiment, a computer-readable storage medium storing a computer program thereon, which when being executed by a processor, cause the processor to perform the methods for restoring color of an underwater image or an underwater video in the first or second embodiments.

Those of ordinary skill in the art can understand that all or part of the steps in the various methods of the above-described embodiments can be executed by a computer program to instruct relevant hardware, and the storage medium can be a computer-readable storage medium, for example, a ferroelectric memory (FRAM, Ferromagnetic Random Access Memory), Read Only Memory (ROM), Programmable Read Only Memory (PROM), Erasable Programmable Read Only Memory (EPROM), Electrically Erasable Programmable Read Only Memory (EEPROM), flash memory, magnetic surface memory, optical discs, or CD-ROM (Compact Disk-Read Only Memory) and other memories; also It may be various devices including one or any combination of the above-mentioned memories.

The above are only preferred embodiments of the present invention, and are not intended to limit the present invention, and any modification, equivalent replacement and improvement etc. made within the spirit and principles of the present invention should be included within the scope of protection of the invention.

What is claimed is:

1. A method for restoring color of an underwater image, wherein comprising steps of:
   S1: obtaining 8-bit RGB pixel values of each pixel of an underwater image and converting the 8-bit RGB pixel values to a linear sRGB color space; that is, converting a pixel value $r_{i-0}$ of the red channel, a pixel value $g_{i-0}$ of the green channel, and a pixel value $b_{i-0}$ of the blue channel of each pixel in 8-bit RGB, to obtain a pixel value $r_{i-1}$ of the red channel, a pixel value $g_{i-1}$ of the green channel, and a pixel value $b_{i-1}$ of the blue channel of each pixel in a linear sRGB color space;
   S2: adjusting the pixel value of each channel of each pixel according to a mean value of the pixel value of each channel obtained in step S1, and obtaining an adjusted pixel value $r_{i-2}$ of the red channel of each pixel, an adjusted pixel value $g_{i-2}$ of the green channel, and an adjusted pixel value $b_{i-2}$ of the blue channel;
   S3: calculating a weight value $\omega_i$ of each pixel according to the adjusted pixel value of each channel of each pixel obtained in step S2;
   S4: calculating a gain Rg of the red channel and a gain Bg of the blue channel of the image according to the weight value $\omega_i$ obtained in step S3; and adjusting, according to the gain Rg of the red channel and the gain Bg of the blue channel, the adjusted pixel value of each channel of each pixel obtained in step S2, to obtain an adjusted pixel value $r_{i-3}$ of the red channel of each pixel, an adjusted pixel value $g_{i-3}$ of the green channel, and an adjusted pixel value $b_{i-3}$ of the blue channel;

S5: converting the adjusted pixel values of each pixel in the linear sRGB color space obtained in step S4 to 8-bit RGB pixel values, and obtaining a pixel value $r_{i-4}$ of the red channel, a pixel value $g_{i-4}$ of the green channel, and a pixel value $b_{i-4}$ of the blue channel of each pixel after conversion;

S6: separately ranking the pixel value of each channel of each pixel obtained in step S5, and obtaining a large adjustment value and a small adjustment value of each channel according to a ranking result; i.e., a large adjustment value Rmax and a small adjustment value Rmin of the red channel, a large adjustment value Gmax and a small adjustment value Gmin of the green channel, and a large adjustment value Bmax and a small adjustment value Bmin of the blue channel;

S7: adjusting, according to the large adjustment value and the small adjustment value of each channel obtained in step S6, the pixel values of each channel of each pixel obtained in step S5, and obtaining an adjusted pixel value $r_{i-5}$ of the red channel, an adjusted pixel value $g_{i-5}$ of the green channel, and an adjusted pixel value $b_{i-5}$ of the blue channel of each pixel; and S8: fusing, according to the weight value $\omega_i$ obtained in step S3, the 8-bit RGB pixel values of each pixel obtained in step S1 with the adjusted pixel value of each channel of each pixel obtained in step S7 to obtain a fused pixel value $r_{i-6}$ of the red channel of each pixel, a fused pixel value $g_{i-6}$ of the green channel, and a fused pixel value $b_{i-6}$ of the blue channel; and outputting a restored underwater image according to the fused pixel value of each channel of each pixel.

2. The method for restoring color of an underwater image according to claim 1, wherein before said step S1, further comprising a step of S0: converting an underwater image to the 8-bit RGB color space from other color spaces.

3. The method for restoring color of an underwater image according to claim 1, wherein step S2 specifically comprises: obtaining respectively a mean pixel value Ra of the red channel, a mean pixel value Ga of the green channel, a mean pixel value Ba of the blue channel of each pixel; if the mean pixel value Ga of the green channel is the largest, then the adjusted pixel value of the red channel is $r_{i-2}=r_{i-1}+(Ga-Ra)\times(1.5-r_{i-1})\times g_{i-1}$, the adjusted pixel value of the blue channel is $b_{i-2}=b_{i-1}+(Ga-Ba)\times(1-b_{i-1})\times g_{i-1}$, the adjusted pixel value of the green channel is $g_{i-2}=g_{i-1}$; if the mean pixel value Ba of the blue channel is the largest, then the adjusted pixel value of the red channel is $r_{i-2}=r_{i-1}+(Ba-Ra)\times(1.5-r_{i-1})\times g_{i-1}$, the adjusted pixel value of the blue channel is $b_{i-2}=b_{i-1}$, the adjusted pixel value of the green channel is $g_{i-2}=g_{i-1}-(Ba-Ga)\times(1-g_{i-1})\times g_{i-1}$; if the mean pixel value Ra of the red channel is the largest, then the pixel values are not adjusted, that is, the pixel value of the red channel is $r_{i-2}=r_{i-1}$, the pixel value of the green channel is $g_{i-2}=g_{i-1}$, and the pixel value of the blue channel is $b_{i-2}=b_{i-1}$.

4. The method for restoring color of an underwater image according to claim 1, wherein in step S3, specifically: a formula for calculating the weight value of each pixel is: $\omega_i=(r_{i-2}+\alpha)*\beta/(b_{i-2}+\alpha)$, where $\alpha$ and $\beta$ are empirical values.

5. The method for restoring color of an underwater image according to claim 4, wherein $\alpha$ is 0.00015, $\beta$ is 3, and the weight value $\omega_i$ of each pixel is adjusted according to a calculated value: when the calculated value of $\omega_i$ is less than 0.1, the weight value $\omega_i$ is adjusted to 0.1; when the calculated value of $\omega_i$ is greater than 0.8, the weight value $\omega_i$ is adjusted to 0.8; and when the calculated value of $\omega_i$ is between 0.1 and 0.8, the weight value $\omega_i$ is not adjusted.

6. The method for restoring color of an underwater image according to claim 1, wherein step S4 comprises:

S41: calculating, according to the pixel value $r_{i-2}$ of the red channel, the pixel value $g_{i-2}$ of the green channel, the pixel value $b_{i-2}$ of the blue channel, and the weight value $\omega_i$ of each pixel, a weighted mean Raw of the red channel, a weighted mean Gaw of the green channel, and a weighted mean Baw of the blue channel of each pixel;

S42: calculating a gain Rg=Gaw/Raw of the red channel and a gain Bg=Gaw/Baw of the blue channel; and S43: calculating a pixel value $r_{i-3}=r_{i-2}*$ Rg of the red channel after gain, and a pixel value $b_{i-3}=b_{i-2}*$ Rg of the blue channel after gain; where if the pixel value after gain is greater than 1, adjust the pixel value to 1.

7. The method for restoring color of an underwater image according to claim 1, wherein a large adjustment value and a small adjustment value of each channel in step S6 is obtained according to a following method:

ranking the pixel value of each channel of each pixel obtained in step S5 from large to small, obtaining a top pixel value and a last pixel value according to a predetermined proportion of each channel, calculating a maximum mean value and a minimum mean value of each channel, and then determining the maximum mean value and the minimum mean value of each channel respectively as the large adjustment value and the small adjustment value of each channel.

8. The method for restoring color of an underwater image according to claim 1, wherein a large adjustment value and a small adjustment value of each channel in step S6 is obtained according to a following method:

ranking the pixel value of each channel of each pixel obtained in step S5 from large to small, determining a pixel value of the th pixel in order from large to small as the large adjustment value of each channel, and a pixel value of the reciprocal th pixel as the small adjustment value of each channel, where n is the number of pixels, and the symbol means rounding.

9. The method for restoring color of an underwater image according to claim 1, wherein a pixel value of each channel of each pixel in step S7 is calculated according to following formulas:

$$r_{i\text{-}5}=(r_{i\text{-}4}-R\text{min})*(RGB\text{max}-RGB\text{min})/(R\text{max}-R\text{min})+RGB\text{min};$$

$$g_{i\text{-}5}=(g_{i\text{-}4}-G\text{min})*(RGB\text{max}-RGB\text{min})/(G\text{max}-G\text{min})+RGB\text{min};$$

$$b_{i\text{-}5}=(b_{i\text{-}4}-B\text{min})*(RGB\text{max}-RGB\text{min})/(B\text{max}-B\text{min})+RGB\text{min};$$

where RGBmax=Max(Rmax, Gmax, Bmax), and RGBmin=Mmin(Rmin, Gmin, Bmin).

10. The method for restoring color of an underwater image according to claim 1, wherein a pixel value of each channel of each pixel in step S8 is calculated according to following formulas:

$$r_{i-6}=r_{i-5}*(\omega_i+r_{i-0}*(1-\omega_i));$$

$$g_{i-6}=g_{i-5}*\omega_i+g_{i-0}*(1-\omega_i);$$

$$b_{i-6}=b_{i-5}*(\omega_i+b_{i-0}*(1-\omega_i)).$$

11. A computer-readable storage medium, wherein the computer-readable storage medium stores a computer program thereon, which when being executed by a processor, cause the processor to perform the method according to claim 1.

12. A method for restoring color of an underwater video, comprising:
capturing an underwater video to be restored; and
processing each video frame of the underwater video to be restored according to a method for restoring color of an underwater image to obtain a video after color restoration;
wherein the method for restoring color of an underwater image, comprises steps of:
S1: obtaining 8-bit RGB pixel values of each pixel of an underwater image and converting the 8-bit RGB pixel values to a linear sRGB color space; that is, converting a pixel value $r_{i-0}$ of the red channel, a pixel value $g_{i-0}$ of the green channel, and a pixel value $b_{i-0}$ of the blue channel of each pixel in 8-bit RGB, to obtain a pixel value $r_{i-1}$ of the red channel, a pixel value $g_{i-1}$ of the green channel, and a pixel value $b_{i-1}$ of the blue channel of each pixel in a linear sRGB color space;
S2: adjusting the pixel value of each channel of each pixel according to a mean value of the pixel value of each channel obtained in step S1, and obtaining an adjusted pixel value $r_{i-2}$ of the red channel of each pixel, an adjusted pixel value $g_{i-2}$ of the green channel, and an adjusted pixel value $b_{i-2}$ of the blue channel;
S3: calculating a weight value $\omega_i$ of each pixel according to the adjusted pixel value of each channel of each pixel obtained in step S2;
S4: calculating a gain Rg of the red channel and a gain Bg of the blue channel of the image according to the weight value $\omega_i$ obtained in step S3; and adjusting, according to the gain Rg of the red channel and the gain Bg of the blue channel, the adjusted pixel value of each channel of each pixel obtained in step S2, to obtain an adjusted pixel value $r_{i-3}$ of the red channel of each pixel, an adjusted pixel value $g_{i-3}$ of the green channel, and an adjusted pixel value $b_{i-3}$ of the blue channel;
S5: converting the adjusted pixel values of each pixel in the linear sRGB color space obtained in step S4 to 8-bit RGB pixel values, and obtaining a pixel value $r_{i-4}$ of the red channel, a pixel value $g_{i-4}$ of the green channel, and a pixel value $b_{i-4}$ of the blue channel of each pixel after conversion;
S6: separately ranking the pixel value of each channel of each pixel obtained in step S5, and obtaining a large adjustment value and a small adjustment value of each channel according to a ranking result; i.e., a large adjustment value Rmax and a small adjustment value Rmin of the red channel, a large adjustment value Gmax and a small adjustment value Gmin of the green channel, and a large adjustment value Bmax and a small adjustment value Bmin of the blue channel;
S7: adjusting, according to the large adjustment value and the small adjustment value of each channel obtained in step S6, the pixel values of each channel of each pixel obtained in step S5, and obtaining an adjusted pixel value $r_{i-5}$ of the red channel, an adjusted pixel value $g_{i-5}$ of the green channel, and an adjusted pixel value $b_{i-5}$ of the blue channel of each pixel; and
S8: fusing, according to the weight value $\omega_i$ obtained in step S3, the 8-bit RGB pixel values of each pixel obtained in step S1 with the adjusted pixel value of each channel of each pixel obtained in step S7 to obtain a fused pixel value $r_{i-6}$ of the red channel of each pixel, a fused pixel value $g_{i-6}$ of the green channel, and a fused pixel value $b_{i-6}$ of the blue channel; and
outputting a restored underwater image according to the fused pixel value of each channel of each pixel.

13. The method for restoring color of an underwater video according to claim 12, wherein when restore color of video frames other than a first frame of the underwater video to be restored, calculate gains of the red and blue channels of a current frame in step S4 according to following formulas:

$$Rg_i=Rg_{i-1}*\theta_1+Gaw/Raw*(1-\theta_1);$$

$$Bg_i=Bg_{i-1}*\theta_1+Gaw/Baw*(1-\theta_1);$$

where, $Rg_i$ is a gain of the red channel of the current frame, and $Rg_{i-1}$ is a gain of the red channel of a previous frame of the current frame, $Bg_i$ is a gain of the blue channel of the current frame, and $Bg_{i-1}$ is a gain of the blue channel of the previous frame; Raw is a weighted mean of the red channel of each pixel of the current frame calculated according to the weight value, Gaw is a weighted mean of the green channel of each pixel of the current frame calculated according to the weight value, Baw is a weighted mean of the blue channel of each pixel of the current frame calculated according to the weight value; and $\theta_1$ is an update rate.

14. The method for restoring color of an underwater video according to claim 12, wherein when restore color of video frames other than a first frame of the underwater video to be restored, calculate a large adjustment value and a small adjustment value of each channel in step S6 according to following formulas:

$$Rmax_i=Rmax_{i-1}*\theta_2+Rmax*(1-\theta_2),Rmin_i=Rmin_{i-1}*\theta_2+Rmin*(1-\theta_2);$$

$$Gmax_i=Gmax_{i-1}*\theta_2+Gmax*(1-\theta_2),Gmin_i=Gmin_{i-1}*\theta_2+Gmin*(1-\theta_2);$$

$$Bmax_i=Bmax_{i-1}*\theta_2+Bmax*(1-\theta_2),Bmin_i=Bmin_{i-1}*\theta_2+Bmin*(1-\theta_2);$$

where $Rmax_i$ is a large adjustment value of the red channel of a current frame, $Rmax_{i-1}$ is a large adjustment value of the red channel of a previous frame of the current frame, Rmax is a larger adjustment value directly calculated according to ranking the pixel value of the red channel of each pixel of the current frame; $Gmax_i$ is a large adjustment value of the green channel of the current frame, $Gmax_{i-1}$ is a large adjustment value of the green channel of the previous frame, Gmax is a larger adjustment value directly calculated according to ranking the pixel value of the green channel of each pixel of the current frame; $Bmax_i$ is a large adjustment value of the blue channel of the current frame, $Bmax_{i-1}$ is a large adjustment value of the blue channel of the previous frame, Bmax is a larger adjustment value directly calculated according to ranking the pixel value of the blue channel of each pixel of the current frame; and $\theta_2$ is an update rate.

15. An electronic device, comprising:
   a memory, for storing a computer program thereon; and
   a processor, for executing the computer program to perform the method according to claim 12.

16. A computer-readable storage medium storing a computer program thereon, which when being executed by a processor, cause the processor to perform the method according to claim 12.

17. An electronic device, wherein comprising:
   a memory, for storing a computer program thereon; and
   a processor, for executing the computer program to perform a method for restoring color of an underwater image, which comprises steps of:
   S1: obtaining 8-bit RGB pixel values of each pixel of an underwater image and converting the 8-bit RGB pixel values to a linear sRGB color space; that is, converting a pixel value $r_{i\text{-}0}$ of the red channel, a pixel value $g_{i\text{-}0}$ of the green channel, and a pixel value $b_{i\text{-}0}$ of the blue channel of each pixel in 8-bit RGB, to obtain a pixel value $r_{i\text{-}1}$ of the red channel, a pixel value $g_{i\text{-}1}$ of the green channel, and a pixel value $b_{i\text{-}1}$ of the blue channel of each pixel in a linear sRGB color space;
   S2: adjusting the pixel value of each channel of each pixel according to a mean value of the pixel value of each channel obtained in step S1, and obtaining an adjusted pixel value $r_{i\text{-}2}$ of the red channel of each pixel, an adjusted pixel value $g_{i\text{-}2}$ of the green channel, and an adjusted pixel value $b_{i\text{-}2}$ of the blue channel;
   S3: calculating a weight value $\omega_i$ of each pixel according to the adjusted pixel value of each channel of each pixel obtained in step S2;
   S4: calculating a gain Rg of the red channel and a gain Bg of the blue channel of the image according to the weight value $\omega_i$ obtained in step S3; and adjusting, according to the gain Rg of the red channel and the gain Bg of the blue channel, the adjusted pixel value of each channel of each pixel obtained in step S2, to obtain an adjusted pixel value $r_{i\text{-}3}$ of the red channel of each pixel, an adjusted pixel value $g_{i\text{-}3}$ of the green channel, and an adjusted pixel value $b_{i\text{-}3}$ of the blue channel;
   S5: converting the adjusted pixel values of each pixel in the linear sRGB color space obtained in step S4 to 8-bit RGB pixel values, and obtaining a pixel value $r_{i\text{-}4}$ of the red channel, a pixel value $g_{i\text{-}4}$ of the green channel, and a pixel value $b_{i\text{-}4}$ of the blue channel of each pixel after conversion;
   S6: separately ranking the pixel value of each channel of each pixel obtained in step S5, and obtaining a large adjustment value and a small adjustment value of each channel according to a ranking result; i.e., a large adjustment value Rmax and a small adjustment value Rmin of the red channel, a large adjustment value Gmax and a small adjustment value Gmin of the green channel, and a large adjustment value Bmax and a small adjustment value Bmin of the blue channel;
   S7: adjusting, according to the large adjustment value and the small adjustment value of each channel obtained in step S6, the pixel values of each channel of each pixel obtained in step S5, and obtaining an adjusted pixel value $r_{i\text{-}5}$ of the red channel, an adjusted pixel value $g_{i\text{-}5}$ of the green channel, and an adjusted pixel value $b_{i\text{-}5}$ of the blue channel of each pixel; and
   S8: fusing, according to the weight value $\omega_i$ obtained in step S3, the 8-bit RGB pixel values of each pixel obtained in step S1 with the adjusted pixel value of each channel of each pixel obtained in step S7 to obtain a fused pixel value $r_{i\text{-}6}$ of the red channel of each pixel, a fused pixel value $g_{i\text{-}6}$ of the green channel, and a fused pixel value $b_{i\text{-}6}$ of the blue channel; and outputting a restored underwater image according to the fused pixel value of each channel of each pixel.

* * * * *